(12) United States Patent
Huynh et al.

(10) Patent No.: US 10,701,115 B2
(45) Date of Patent: Jun. 30, 2020

(54) DISPLAY OF VIRTUAL ROOM

(71) Applicant: Rabbit Asset Purchase Corp., San Diego, CA (US)

(72) Inventors: Aaron Huynh, Redwood City, CA (US); Cathrine Lindblom Gunasekara, Redwood City, CA (US); Jane Temkin, Redwood City, CA (US); Paul Jack, Redwood City, CA (US)

(73) Assignee: Rabbit Asset Purchase Corp., San Diego, CA (US)

( * ) Notice: Subject to any disclaimer, the term of this patent is extended or adjusted under 35 U.S.C. 154(b) by 118 days.

(21) Appl. No.: 15/957,786

(22) Filed: Apr. 19, 2018

(65) Prior Publication Data
US 2018/0309806 A1    Oct. 25, 2018

Related U.S. Application Data

(60) Provisional application No. 62/487,400, filed on Apr. 19, 2017.

(51) Int. Cl.
*H04L 29/06* (2006.01)
*G06F 3/0481* (2013.01)
*G06F 3/0488* (2013.01)

(52) U.S. Cl.
CPC .......... *H04L 65/403* (2013.01); *G06F 3/0481* (2013.01); *G06F 3/04886* (2013.01); *G06F 2200/1614* (2013.01); *G06F 2200/1637* (2013.01); *G06F 2203/04803* (2013.01)

(58) Field of Classification Search
CPC . H04L 65/403; G06F 3/0481; G06F 3/04886; G06F 2200/1614; G06F 2200/1637; G06F 2203/04803
See application file for complete search history.

(56) References Cited

U.S. PATENT DOCUMENTS

| 10,126,927 | B1* | 11/2018 | Fieldman | G06F 3/04847 |
| 2008/0049922 | A1* | 2/2008 | Karniely | H04M 3/562 |
| | | | | 379/205.01 |
| 2009/0033737 | A1* | 2/2009 | Goose | G06F 3/0481 |
| | | | | 348/14.07 |
| 2012/0246582 | A1* | 9/2012 | Leacock | G06Q 10/10 |
| | | | | 715/753 |
| 2013/0018953 | A1* | 1/2013 | McConnell | G06Q 10/10 |
| | | | | 709/204 |
| 2013/0031475 | A1* | 1/2013 | Maor | G06Q 10/10 |
| | | | | 715/706 |

(Continued)

*Primary Examiner* — Tadesse Hailu
(74) *Attorney, Agent, or Firm* — Maschoff Brennan; Jason W. Croft

(57) ABSTRACT

In one embodiment, a method includes providing, to each of a number of client devices, at least part of a graphical user interface (GUI) corresponding to a virtual room. The virtual room contains a number of users. The method further includes providing, to each of the client devices, a first portion of the GUI identifying at least some of the users in the virtual room. The method further includes providing, to each of the client devices, a second portion of the GUI, where the second portion of the GUI displays: (1) one or more user interactions from one or more of the users in the virtual room; and (2) for each user interaction, an identification of each particular user who generated the that user interaction.

20 Claims, 13 Drawing Sheets

(56) References Cited

U.S. PATENT DOCUMENTS

| | | | |
|---|---|---|---|
| 2014/0047027 A1* | 2/2014 | Moyers | H04L 51/04 |
| | | | 709/204 |
| 2015/0263996 A1* | 9/2015 | Abate | H04M 1/72552 |
| | | | 715/753 |
| 2016/0036962 A1* | 2/2016 | Rand | H04R 1/1041 |
| | | | 455/418 |
| 2016/0234264 A1* | 8/2016 | Coffman | H04L 65/1069 |
| 2016/0234276 A1* | 8/2016 | Ouyang | H04L 65/403 |
| 2016/0255126 A1* | 9/2016 | Sarris | H04L 65/1096 |
| | | | 348/14.08 |
| 2017/0054663 A1* | 2/2017 | Geiger | H04L 51/10 |

* cited by examiner

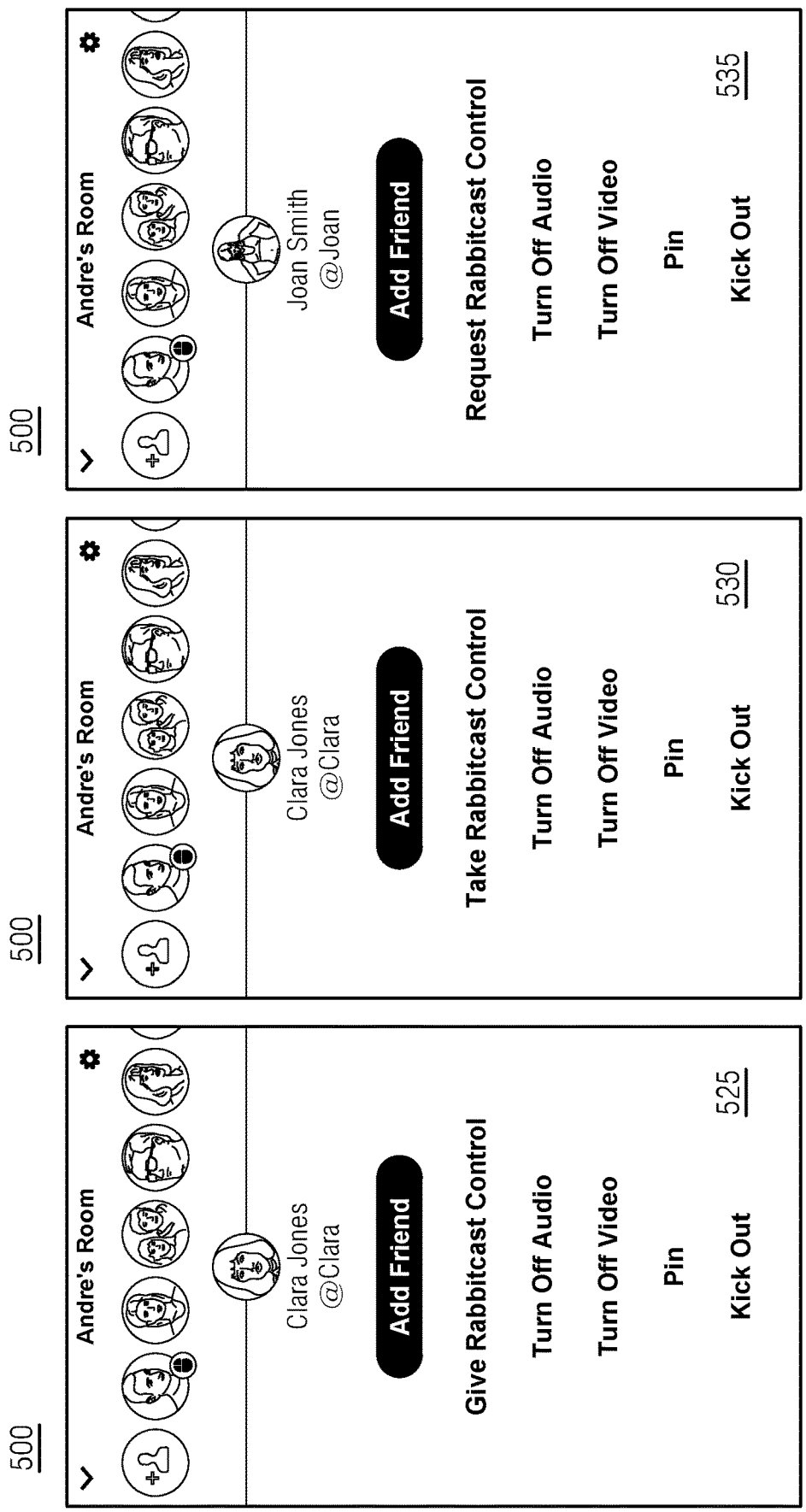

DISPLAY OF VIRTUAL ROOM

PRIORITY

This application claims the benefit under 35 U.S.C. § 119 of provisional application No. 62/487,400 titled "Virtual Remote Control" and filed on 19 Apr. 2017.

TECHNICAL FIELD

This disclosure generally relates to controlling and displaying content in a virtual room.

BACKGROUND OF INVENTION

In large online viewing rooms there is often a sense of chaos and lack of control. Room owners or admins may hold little to no control over the actions that other users in the room may take. When it comes to viewing content within a room there are often a number of users who want to watch different videos. This can lead to users constantly selecting or changing the content that is displayed within a virtual room that ultimately degrades the overall viewing experience. Further, even when a room owner or admin has the control to limit such activity, the user or admin may not be aware of this ability. For example, a room owner may have the ability to select users who are able to control the content that is currently displayed within a room, however a room owner may not remember who was passed control or how many people were passed control. Even worse, when a room owner releases control of what content is currently being displayed, anyone else in the room may be able to pick it up.

The problem also applies in the reverse direction. For example, certain online viewing rooms allow no control to users. Therefore, a user is stuck within a room with zero control of the content that is currently being displayed. These users had no way of requesting control over the room in a simple and orderly way.

Therefore, there is a need to allow orderly control over the content that is to be displayed within a virtual room. This problem may be solved by implementing a transparent and easy to understand way of requesting, granting, and receiving a "virtual remote control" such that a user who is holding the remote control is able to edit the content that is currently displayed within the online virtual room.

BRIEF DESCRIPTION OF THE DRAWINGS

FIGS. 5C-E illustrate an example screen upon selecting a particular user.

DESCRIPTION OF EXAMPLE EMBODIMENTS

A user interface (UI) may be incorporated into any type of software applications, including, for example, desktop applications, mobile applications, or web-based applications, to enable users to interact with and control the applications. A graphical user interface (GUI) is a type of user interface that enables users to interact with software applications through multi-media objects, including, for example, icons, buttons, menus, images, video, or audios.

Figure 1:
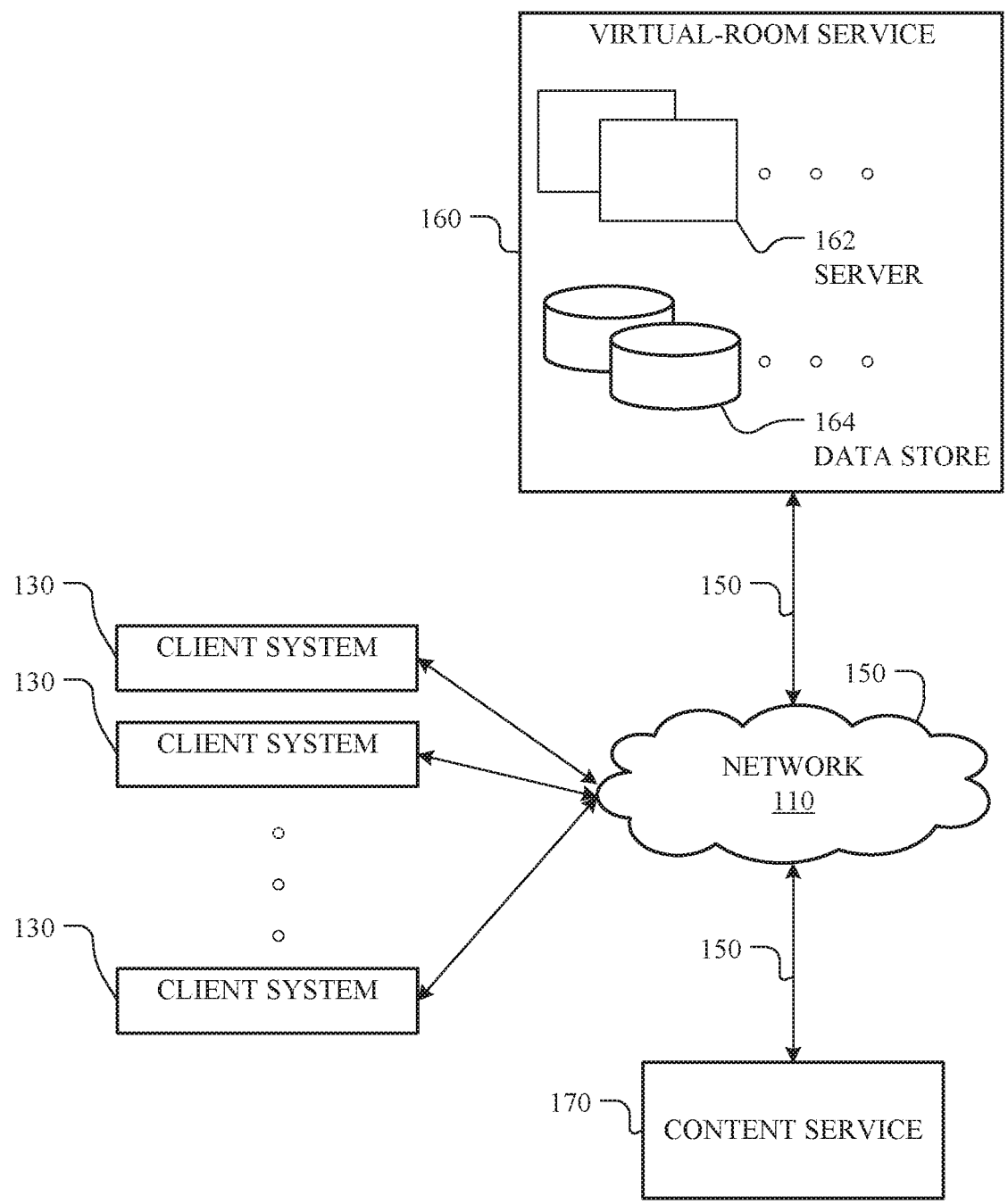
FIG. 1 illustrates an example network environment associated with room service networking system.

FIG. 1 illustrates an example network environment 100 associated with a virtual-room service 160. Network environment 100 includes multiple client systems 130, virtual-room service 160, and at least one content system 170 connected to each other by a network 110. Although FIG. 1 illustrates a particular arrangement of particular systems, this disclosure contemplates any suitable arrangement of any suitable systems. As an example and not by way of limitation, network environment 100 may include multiple server systems 160. As another example, network environment 100 may include multiple third-party systems 170. As another example, server system 160 may be physically or logically co-located with each other in whole or in part. Moreover, although FIG. 1 illustrates a particular number of client systems 130, server systems 160, third-party systems 170, and networks 110, this disclosure contemplates any suitable number of client systems 130, server systems 160, third-party systems 170, and networks 110. As an example and not by way of limitation, network environment 100 may include multiple client system 130, room service systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

In particular embodiments, FIG. 1 may illustrate a method for hosting a virtual-room service 160 between a plurality of client systems 130, sending room information from virtual-room service 160 from a server 162 and/or data store 164 to one or more client systems 130 over network 110 which may contain third party content from content service 170. As examples only, and not by way of limitation, the following are examples of content services 170 in particular embodiments: YOUTUBE, NETFLIX, FACEBOOK, SPOTIFY, websites, web pages, HBO GO, SHOWTIME ANYTIME, mobile applications, or any other similar service.

In particular embodiments, virtual-room service 160 may host a "room" for multiple participants to view information from content service 170. In particular embodiments, the room is a virtual room where tens, hundreds, thousands, or millions of users may participate with each other. In further embodiments, each room may be assigned a remote desktop (e.g. server) of virtual-room service 160. In further embodiments, each remote desktop may be controlled by one user in each of the rooms. In particular embodiments, multiple users may control the remote desktop of virtual-room service 160.

In particular embodiments, client system 130 may access virtual-room service 160 over network 150 to obtain access to a remote desktop (e.g. server). In particular embodiments, upon accessing a remote desktop, client system 130 may use the accessed remote desktop as their own. For example, and not by way of limitation, upon accessing the remote desktop, client system 130 may use the remote desktop to access YOUTUBE or NETFLIX and begin streaming content. In particular embodiments, multiple client systems 130 may be connected to the same room with the user who accessed the remote desktop. In particular embodiments, all of client systems 130 in the same room may simultaneously view the content the owner of the room has accessed. In particular embodiments, server 162 may send the audio and video content of each client system 130 in the room to all of the other client systems 130 in the room. In particular embodiments, data store 164 may track any and all activity that occurs within the room, such as users preferences, the information content service 170 has provided, or any other pertinent information.

In particular embodiments, client system 130 may receive other participants audio and/or video streams whom are also in the room. In particular embodiments, virtual-room service 160 sends the participants audio and/or video streams to the other participant's client systems 130 who are in the room. In particular embodiments, such system may enable users within a room to stream the respective audio and video streams to different remote desktops located within virtual-room service 160 and to track the associations, user preferences, etc. and store such information in data store 164.

In particular embodiments, receiving audio and video streams from a remote desktop (e.g. server) may include capturing the audio and video streams from the client systems 130, sending the audio and video streams to server 162, and subsequently sending the streams to all client systems in the room. In particular embodiments, capturing the audio and video streams may include capturing information from client systems 130 microphone and camera. In particular embodiments, the captured streams may include content streamed from content service 170. As an example and not by way of limitation, the captured stream may include content streamed from a YOUTUBE video.

Links 150 may connect client system 130, room service networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, room service networking system 160 may be a network-addressable computing system that can host an online social network. Room service networking system 160 may generate, store, receive, and send social-networking data, such as, for example, user-profile data, concept-profile data, social-graph information, or other suitable data related to the online social network. Room service networking system 160 may be accessed by the other components of network environment 100 either directly or via network 110. As an example and not by way of limitation, client system 130 may access room service networking system 160 using a web browser 132, or a native application associated with room service networking system 160 (e.g., a mobile social-networking application, a messaging application, another suitable application, or any combination thereof) either directly or via network 110. In particular embodiments, room service networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, room service networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a room service networking system 160, or a third-party system 170 to manage, retrieve, modify, add, or delete, the information stored in data store 164.

In particular embodiments, room service networking system 160 may provide users with the ability to take actions on various types of items or objects, supported by room service networking system 160. In particular embodiments, room service networking system 160 may provide users with the ability to view information from content service 170 without client system initiating their own room. In particular embodiments, room service networking system 160 may determine certain information to display from content service 170 at a predetermined time and invite users to join an already existing room. For example, every Friday at 7:00 pm the system may stream a horror movie and the system may provide a notice to users that Friday at 7:00 pm a horror movie will be streamed. In further embodiments, upon logging in to the service, if the horror movie has already begun, the system may provide a notification to the user to join the Friday horror room. As another example and not by way of limitation, the items and objects may include groups or social networks to which users of room service networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in room service networking system 160 or by an external system of third-party system 170, which is separate from room service networking system 160 and coupled to room service networking system 160 via a network 110.

In particular embodiments, room service networking system 160 may be capable of linking a variety of entities. As an example and not by way of limitation, room service networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating room service networking system 160. In particular embodiments, however, room service networking system 160 and third-party systems 170 may operate in conjunction with each other to provide social-networking services to users of room service networking system 160 or third-party systems 170. In this sense, room service networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, room service networking system 160 also includes user-generated content objects, which may enhance a user's interactions with room service networking system 160. User-generated content may include anything a user can add, upload, send, or "post" to room service networking system 160. As an example and not by way of limitation, a user communicates posts to room service networking system 160 from a client system 130. Posts may include data such as status updates or other textual data, location information, photos, videos, links, music or other similar data or media. Content may also be added to room service networking system 160 by a third-party through a "communication channel," such as a newsfeed or stream. In particular embodiments, posts that include links may be rendered as images. In particular embodiments, the system may be aware of the context of the content and may be able to further inform the user that the particular content may be explicit. In further embodiments, the system may tag the content in a specific way to make parsing through potentially explicit material more simple. This may be a beneficial way if a user is under the age of 18 and may be prompted to "Agree" to enter a particular room at their own risk.

In particular embodiments, room service networking system 160 may include a variety of servers, sub-systems, programs, modules, logs, and data stores. In particular embodiments, room service networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Room service networking system 160 may also include suitable components such as network interfaces, security mechanisms, load balancers, failover servers, management-and-network-operations consoles, other suitable components, or any suitable combination thereof. In particular embodiments, room service networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories.

A web server may be used for linking room service networking system 160 to one or more client systems 130 or one or more third-party system 170 via network 110. An API-request server may allow a third-party system 170 to access information from room service networking system 160 by calling one or more APIs. An action logger may be used to receive communications from a web server about a user's actions on or off room service networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of room service networking system 160. A privacy setting of a user determines how particular information associated with a user can be shared. The authorization server may allow users to opt in to or opt out of having their actions logged by room service networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

In particular embodiments, a first computing device may access a second computing device using a remote desktop service. A connection is initiated on the second computing device to connect to the first computing device and a remote desktop client may be initiated on the second computer. A request may then be created for a remote desktop protocol session with the first computing device using an operating environment where the operating environment obtains its settings from an operating environment configuration file. In particular embodiments, the request may be communicated through a cloud service to the first computing device. In further embodiments, an authorization is received to begin the desktop protocol session from a remote desktop server application on the first computing device through the cloud service and a channel is established from the second computing device to the first computing device through the cloud service. Remote desktop protocol data flow begins from the first computer to the second computer through the cloud services where a second computer display and operating system experience is virtually the same as a first computer and all operations on the first computer are available on the second computer by using the second computer display.

For example, a request for a remote desktop protocol session with the first computing device may be created using a particular operating environment. The operating environment may be spread over a network and parts, which may be spread over the network and may be accessed from the various network nodes as needed. In further embodiments, other nodes in the operating system may access different parts of the operating environment from an of the nodes on the network.

In particular embodiments, the request for a remote desktop protocol session may be communicated through a cloud service to the computing device. The cloud service may represent a service or application that controls data through a widely dispersed network, such as the internet. The response to the request may be handed in any number of ways known in the art. In particular embodiments, a display is created on the first computing device where a user may select to allow a user to remotely control the first computing device. In another embodiment, the first computing device has a list of acceptable second computing devices that have standing permission to remotely access the first computing device.

In particular embodiments, an authorization step may occur where the desktop protocol session from a remote desktop server application may be received on the first computing device through the cloud service. In further embodiments, the first computing device may be a node in the network cloud and may receive the request of a remote connection.

In further embodiments, a channel may be established from the second computing device to the first computing device through the cloud server. Assuming permission was granted, a channel may then be created. In particular embodiments, the channel may be created using SSL or through any other appropriate technology known in the art.

In particular embodiments, a remote desktop protocol data flow may being from the first computing device to the second computing device through the cloud services. In further embodiments, as a result, the second computing device display may be virtually the same as the first computing device display. In particular embodiments, any operation on the first computing device may be available on the second computing device by using the second computing device display. The display may be a copy of the graphical elements of the first display making the display on the second computing device to be viewed as virtually exact as the first display.

In particular embodiments, in order to for the computing device to be remotely accessed, the first computing device may have to register with a remote access gateway. In particular embodiments, the registration may take a variety of forms and use hardware or software applications.

In particular embodiments, a user remotely accessing a second computing device may access such device by use of a touch screen or similar device. For example, a user may access a remote desktop through a cellphone, PDA, television, touch screen device, or any other suitable device, however such device may not have the standard mouse and keyboard configuration. In particular embodiments, a user may still navigate the remote device by use of a touch screen or any other means even though the user's device does not have matching means of navigation.

In particular embodiments, a display device may include a user interface (UI) displayed on screen and connected to the processor. The screen may be configured to display text, digital images, or video. The screen may be configured to be user interactive (e.g., recognize and accept user inputs to interact with device software). The screen may include any suitable type of display, for example, an electrophoretic display, a liquid crystal display (LCD), a light-emitting diode (LED) display, an organic light-emitting diode (OLED) display, an organic field-effect transistor (OFET) display, or other suitable display. This disclosure contemplates any suitable type of display configured to be user interactive. In particular embodiments, the screen may be a touch screen and able to receive gestures from a user. In particular embodiments, the gesture may include a single-touch interaction or a multi-touch interaction.

In particular embodiments a remote desktop protocol, or any other suitable method known in the art, may be used for video conferencing between a plurality of participants. In particular embodiments the video conferencing may include sending conversation group information from a managing server (or remote desktop) to a second device. In particular embodiments, a managing server (or remote desktop, server, etc.) may send multiple participants audio and video streams to a set of user devices. In particular embodiments, this may allow users within a group to stream a certain audio clip, view web content, or simply use a remote desktop as a group of individuals. In particular embodiments, one group user holds the "remote" and has "control" over the remote desktop. In particular embodiments, the user with the "remote" is able to choose or select content for the group of participants to view. In particular embodiments, such methods may facilitate video conferring, video chatting, or any other suitable audio-video communications between a plurality of users. In particular embodiments, the user holding the "remote control" may control the remote desktop by a touch screen. In particular embodiments, the user controlling the "remote control" may use an electron device, such as a cellphone with a touch screen, to control a remote desktop. In particular embodiments, the user's device may be a touch screen device, however the remote desktop may not be a touch screen device. In particular embodiments, a touch screen device may have controls to control a remote non-touch screen device.

In particular embodiments, each group of participants may be assigned to a particular remote desktop, server, etc. for their current session. In further embodiments, the group of participants may be assigned to different devices. In further embodiments, there may be hundreds, thousands, millions, or billions of chat room or groups in which a user may join. In further embodiments, each "room" where a user or groups of users enter may support audio and/or video sharing between an unlimited number of participants. In particular embodiments, each room may contain one or more "remote controls." In particular embodiments, there may be one remote per room. In particular embodiments, the remote allows a user to determine what the others in the room will be watching, just as a TV remote allows the user to change channels. In particular embodiments, the user with the remote, the controlling user, is the user responsible for choosing content to display to the others in the room. In particular embodiments, the users in a room view the content the user holding the "remote control" has selected for viewing. In particular embodiments, the remote may be passed from user to user so that one person may hold the remote at a time.

In particular embodiments, a user may view a virtual chat room on her device in either portrait mode or landscape mode. In particular embodiments, while viewing content displayed in a virtual chat room in portrait mode the device may display both content and a chat room. In particular embodiments, upon turning the phone to landscape mode the chat room portion of the screen may be blended with the content viewing portion of the screen such that the entire screen displays the content selected to be displayed. In further embodiments, the virtual room service may allow for different types of viewing. For example, a user in a virtual room may be in viewing mode (e.g., the user is watching content and may also be chatting while watching the content). As a further example, the user may be in an editing mode (e.g., the user is currently looking for new content to display within the virtual room).

Figure 2A:
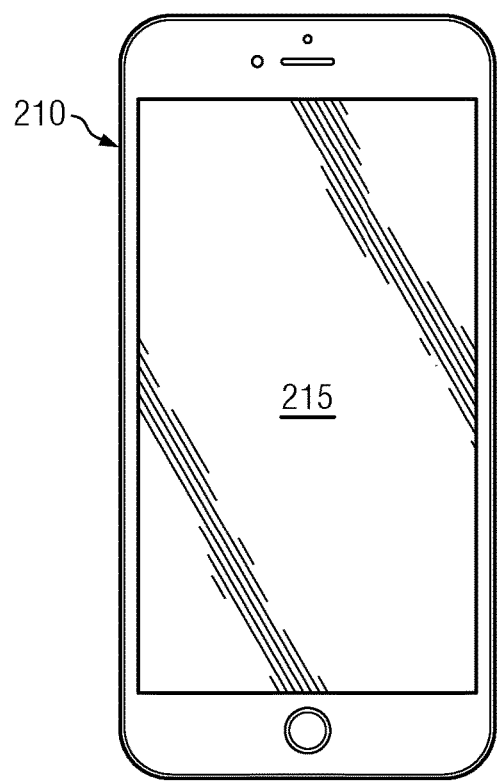
FIGS. 2A-B illustrate an example mobile electronic device.

In particular embodiments, a mobile electronic device (e.g., Smartphone or tablet computer) may include a touch-screen capable of receiving touch input. FIG. 2A illustrates an example mobile electronic device 210 (e.g., a Smartphone) having a touchscreen 215. Touchscreen 215 may incorporate one or more touch sensors and a touch-sensor controller for detecting the presence and location of a touch (e.g., from a user's finger) or the proximity of an object (e.g., a stylus). In particular embodiments, a specific touch detected via touchscreen 215 may result in a touch input event.

Figure 2B:
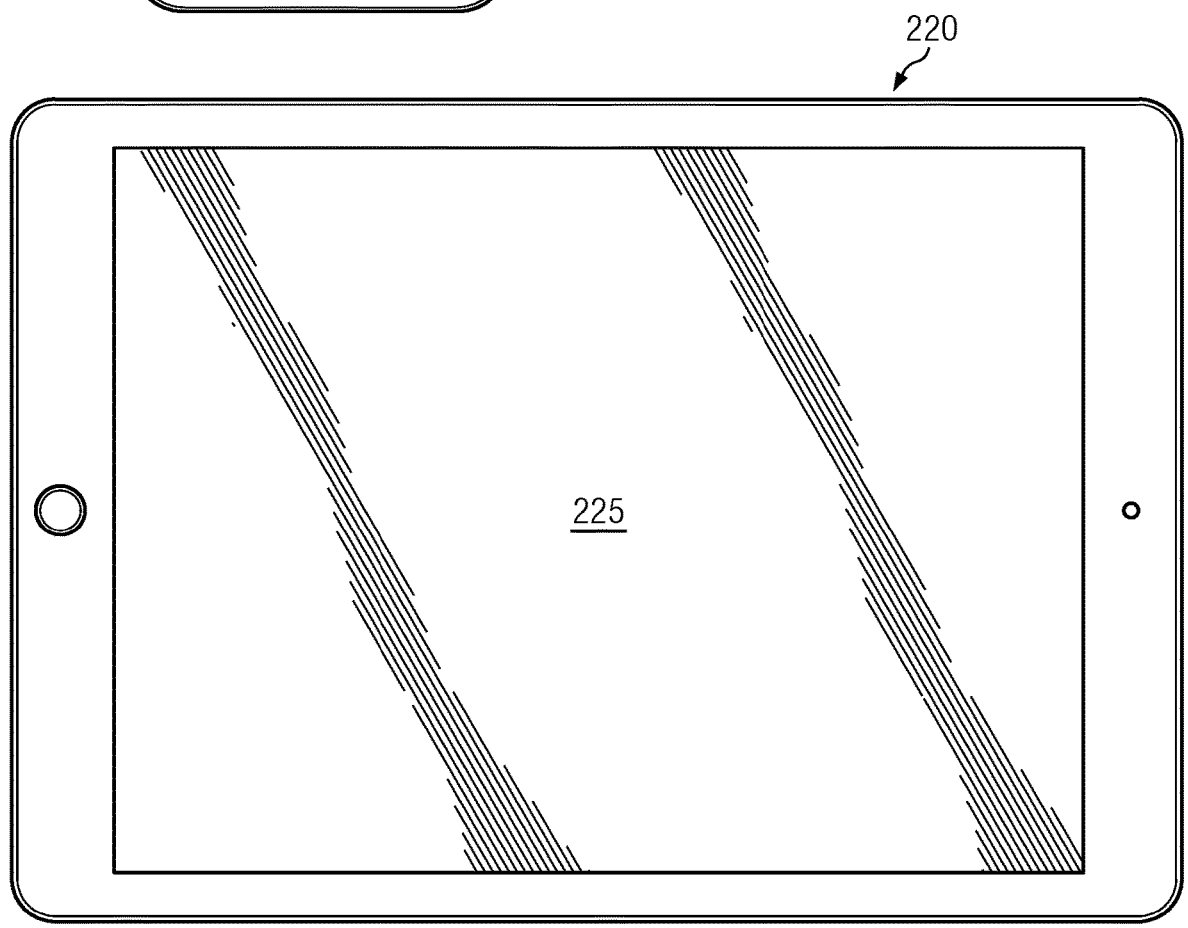

Different mobile electronic devices may have different designs. As a result, the size, shape, or aspect ratio of the touchscreens of different mobile devices may differ. FIG. 2B illustrates another example mobile electronic device 220 (e.g., a tablet computer) having a touchscreen 225. Similarly, touchscreen 225 may incorporate one or more touch sensors and a touch-sensor controller for detecting the presence and location of a touch (e.g., from a user's finger) or the proximity of an object (e.g., a stylus). A specific touch detected via touchscreen 225 may result in a touch input event. However, since mobile electronic devices 210 and 220 are two different types of devices, their respective touchscreen 215 and 225 have different sizes and aspect ratios. The disclosure contained in this application focuses on mobile electronic device 210 for simplicity and brevity, however the disclosure equally applies to mobile electronic device 220.

There may be various types of touches or gestures, such as single tap, double tap, short press, long press, press and hold, slide, swipe, flip, pinch open, pinch close, pan, or drag, corresponding to various types of touch input events. Different touch input events may result in different responses and this disclosure contemplates any applicable gesture.

Figure 3:
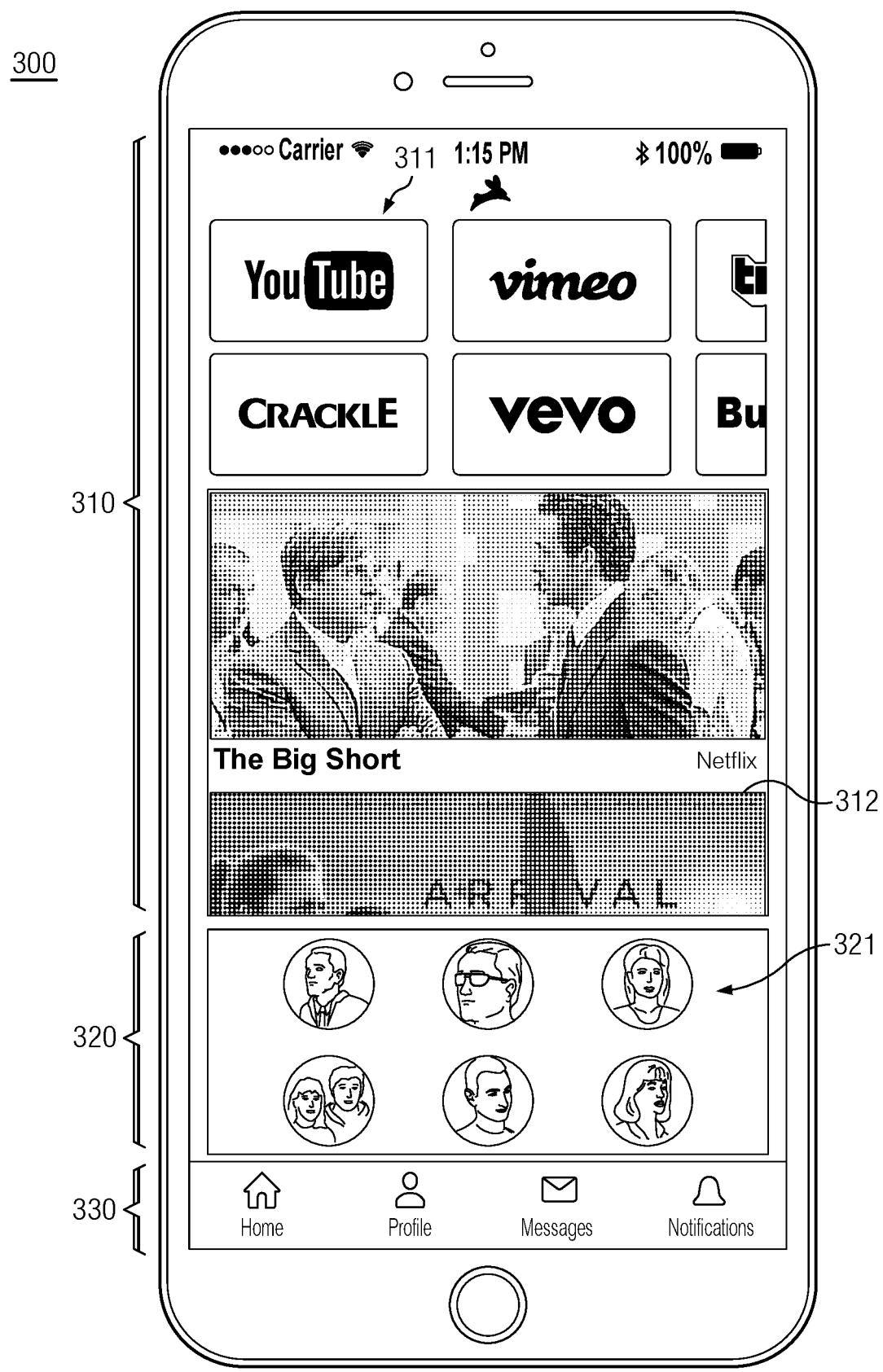
FIG. 3 illustrates an example UI home screen.

FIG. 3 illustrates a mobile electronic device 210, which is associated with an example of a virtual room networking user. Mobile electronic device 210 includes a displayed region 310, 320, and 330, each representing different portions of the displayable region. In particular embodiments, mobile computing device 210 may display a socialized dashboard or "social-video dash" in displayable region 310, 320, and 330 that is a user interface (UI) that may be displayed on a mobile electronic device 210 where the user is not actively interaction with an application executed on mobile computer device 210. In particular embodiments the "social-video dash" may be constantly accessible. As an example and not by way of limitation, a persistent UI or social-video dash may be an application that functions as a home or default screen of mobile electronic 210, as described below.

In particular embodiments, displayable region (310, 320, and 330) includes a displayed home content 310. Displayed home content 310 may provide a convenient shortcut to join different virtual room or channels on mobile electronic device 210 and is defined in further detail below. Displayed home content 310 may provide a user with either curated content specifically selected for that particular user or may display "default" content to a user. In particular embodiments, curated content may be based on a user's viewing habits, the user's friends habits, or based on pre-defined values (i.e., age, location, sex, etc.) In particular embodiments, the user may select any of the displayed content items 311 to either join a virtual room or join the user's own room to start watching the selected displayed content item 311. For example, in FIG. 3, a user may select the "YouTube" displayed content item 311 and then be placed into a virtual chat room with the "YouTube" webpage loaded and ready to be played by the user. In particular embodiments, the user may scroll through the displayed home content 310 to view other content items 312. In particular embodiments, displayed home content 310 may display a portion of a content item 312 inside of the displayed home content 310 region to make clear to the user that displayed home content 310 contains more than what is currently displayed home content 310 region and that the user may swipe up or down to view additional content items.

In particular embodiments, displayable region (310, 320, and 330) includes a friend list region 320. Friend list region 320 displays the user's friends 321. In particular embodiments, each friend 321 is displayed as a circle (although friend 321 may represent any shape), and within the circle the particular friend's avatar is placed in the circle. In particular embodiments, friend 321 is represent by a photo of the particular user, however, any suitable image, video, color, etc. may be selected. In particular embodiments, the avatar within friend 321 is selected by the friend of the user (i.e., the avatar selected by friend 321 is the same avatar shown to all other users). In particular embodiments, the user may modify the avatar displayed in friend 321. In particular embodiments, upon user selecting a particular friend 321 a menu opens. In particular embodiments, the menu may contain a range of options for the user to select. For example, and not by way of limitation, the options may be: Join Room, Join My Room, Send Message, Delete Friend, Send Photo, Send Video, Poke, etc. In particular embodiments, and upon selecting or tapping on a particular friend 321 the user automatically joins the selected friends virtual room. In particular embodiments, only the friends of the user that are currently on-line are displayed within friend list region 320. In particular embodiments, all of the user's friends may be displayed within friend list region 320 and the list of friends that are on-line may be displayed first. In further embodiments, the user's friends currently on-line may contain some sort of indication that the friend is online (i.e., a green circle around the avatar, a green check, etc.)

In particular embodiments, displayable region (310, 320, and 330) includes an information bar 330. In particular embodiments, information bar 330 may contain a Home, Profile, Message, and Notification selection. In particular embodiments, information bar 330 allows a user to navigate to particular menus, view messages from others, receive notifications from the system or other users (i.e., room invites or friend requests), and allow the user to edit his or her profile.

Figure 4:
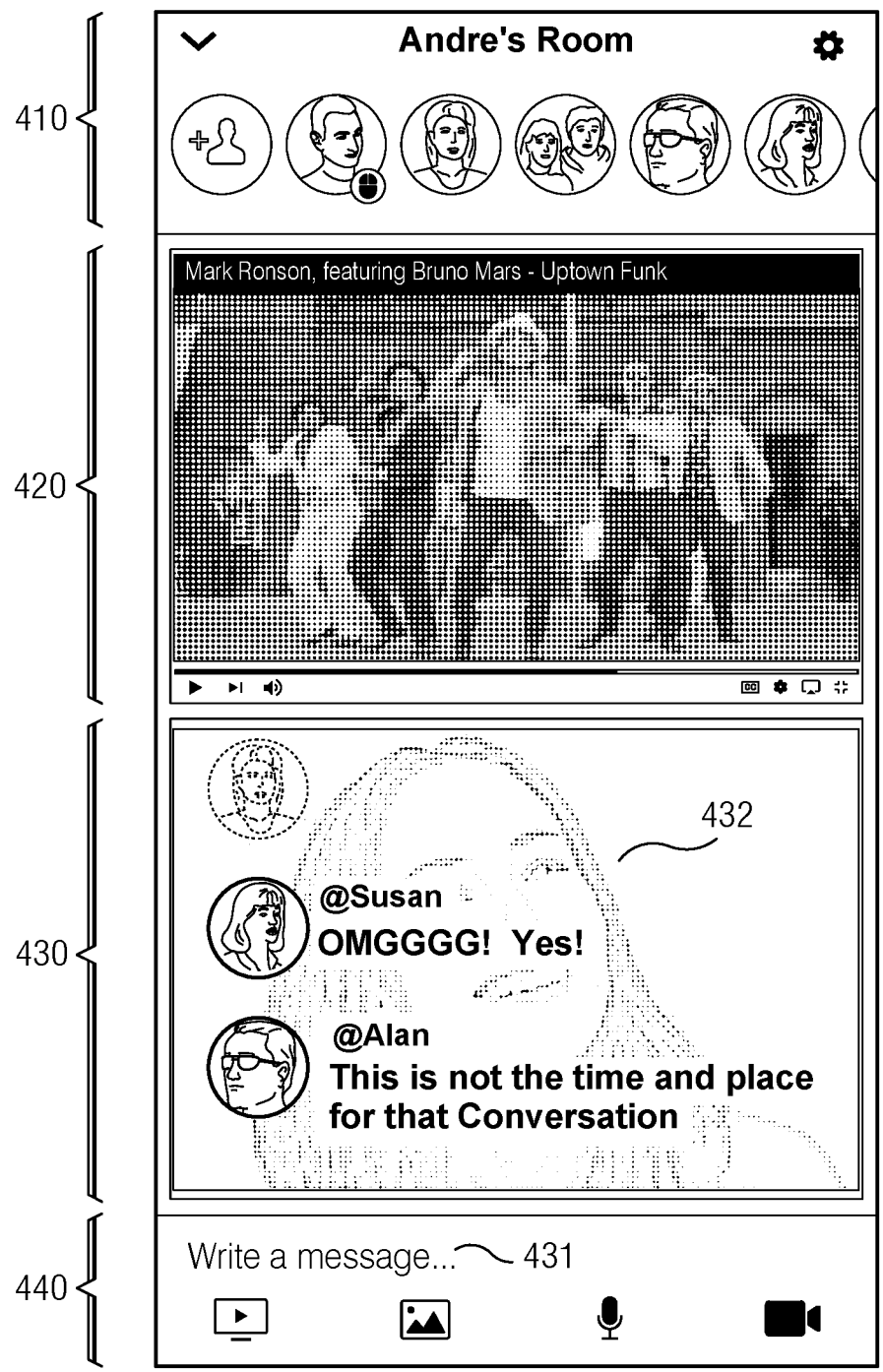
FIG. 4 illustrates an example of a device in viewing mode while in a portrait orientation.

FIG. 4 illustrates an example virtual room UI. In particular embodiments, FIG. 4 represents a virtual room UI when electronic device 210 is in portrait mode as opposed to landscape mode. In particular embodiments, when a user is holding his or her electronic mobile device 210 in a vertical position (as opposed to horizontal) the virtual room networking service may present the user a virtual room UI 400 displayed in FIG. 4. In particular embodiments, a user may be placed into virtual room 400 upon clicking on one of the content items 311 in displayed home content region 310. In particular embodiments, a user may be presented with virtual room 400 upon selecting friend 321 in displayed friend list 320. In particular embodiments, a user may be presented with virtual room 400 upon joining or creating the user's own room or a friends room.

In particular embodiments, virtual room UA 400 may include one or more displayable regions, such as displayable region (410, 420, 430, 440), which may display content within a virtual room. In particular embodiments displayable region (410, 420, 430, 440) may comprise friend bar 410. In particular embodiments, and discussed in further detail below, friend bar may display the users in the particular virtual room. In further embodiments, displayable region (410, 420, 430, 440) may comprise current content 420. In particular embodiments, current content 420 may present to the user's within the virtual room the content that is currently selected for display. For example, if a user is watching YouTube and selects a video "Federer v. Nadal, 2017 Aussie Final" the YouTube video of Federer and Nadal may be presented to the user. In particular embodiments, current content 420 is displayed to all user's in the virtual service. As stated above, in particular embodiments, one user in the chat room is responsible for selecting current content 420 for display to the other users within the virtual room (i.e., the user that has the "remote control"). In particular embodiments, multiple users may have permission to select current content 420 to display to the chat room.

In particular embodiments, displayable region (410, 420, 430, 440) may comprise of the displayed region within a virtual room. In particular embodiments displayable region (410, 420, 430, 440) may comprise of dynamic discussion region 430. In particular embodiments, and discussed in further detail below, dynamic discussion region 430 may represent an area of the displayable region for the user's to exchange message with each other. In particular embodiments, a user in the virtual room may wish to submit a message to the virtual room. In particular embodiments, a user may tap or press within the "write a message . . . " bar 431 to submit a message to the virtual room. In particular embodiments, upon pressing or tapping within message bar 431 a keyboard may be presented to the user. Upon being presented with a keyboard the user is able to type a message and submit the message to the virtual room. In particular embodiments the messages will be displayed from the bottom upward (i.e., a "new" message appears on the bottom of the screen and as newer messages are posted the "new" message is moved upward to the top of dynamic discussion region 430). In particular embodiments, a message posted in dynamic discussion region 430 may appear as normal font and after a period of time (e.g., 3 seconds, 5 seconds, 10 seconds, a minute or more) begin to turn transparent to indicate that the message is older. In particular embodiments, the most recent message posted in dynamic discussion region 430 may never change in character (e.g., transparency). In particular embodiments, as messages move in the upward direction towards the end of dynamic discussion region 430 the messages begin to turn transparent to indicate that the message will be pushed outside of dynamic discussion region 430. In particular embodiments, the messages may never change character (e.g., transparency). In particular embodiments, instead of messages appearing from bottom to top, the messages may appear from top to bottom. In particular embodiments the avatar of the user is displayed next the user's posted message. In further embodiments, the username of the user is posted with the user's posted message. In further embodiments, instead of displaying the avatar of the user who posted the message a live video feed of the user may be displayed next to the user's posted message.

In particular embodiments, dynamic discussion region 430 may include a representation 432 of the user that is currently speaking in the virtual room. In particular embodiments representation 432 of the user may be displayed as a photo. In particular embodiments representation 432 is displayed within the entire background of dynamic discussion region 430. In particular embodiments, instead of displaying a photo of the user that is currently speaking within dynamic discussion region 430 the system may display the video of the user that is currently speaking. In particular embodiments, a user that is typing a message to be displayed within dynamic discussion region 430 may be displayed in the background of dynamic discussion region 430. In particular embodiments, the user displayed within dynamic discussion region 430 is presented to the users within the virtual room behind the text displayed within dynamic discussion region 430. For example, a user that is speaking or typing may be displayed in the entire dynamic discussion region 430, however, the text displayed within dynamic discussion region 430 is still visible. In particular embodiments, the virtual room networking system may determine the color of the text should be changed depending on the image displayed in the background. For example, a user speaking and presenting within dynamic discussion region 430 may be wearing a white shirt and the text displayed within dynamic discussion region 430 is also white. Upon the virtual room networking system detecting that the two colors are similar the system may gradually increase the darkness (e.g., grey-scale or color) of the text displayed within dynamic discussion region 430 such that the text is readable. In particular embodiments, the user presented within dynamic discussion region 430 may be altered by the system in order to not change the color of the text. In particular embodiments, each user may not be presented a video of the user speaking. For example, if the system detects a particular user is experience "lag" the system may present just the avatar of the user speaking while other users with a faster connection may continue to view the live video feed of the user speaking. In particular embodiments, a user may not have his or her video camera turned on and instead of displaying a video feed of the user the users avatar may be displayed. In particular embodiments, multiple users may be speaking at the same time, or typing messages at the same time. In particular embodiments, dynamic discussion region 430 may dynamically divide the region to display each user currently speaking in the virtual room. In particular embodiments, dynamic discussion region 430 may dynamically divide the region to display each user currently typing a message to be displayed in the region. In further embodiments, dynamic discussion region 430 may display both speakers and typers.

In particular embodiments displayable region (410, 420, 430, 440) may comprise of bottom bar 440. In particular embodiments, bottom bar 440 may include an add video button, add photo, microphone, and video button. For example, a user may wish to turn her video camera off or on. In particular embodiments, upon a user selecting to turn her video camera on, the user's video feed will be displayed in real-time across friend bar 410. As another example, upon a user turning her video camera off, the video feed of the user in friend bar 410 would return to the user's avatar or profile picture. Additionally, bottom bar 440 includes message bar 431. Upon a user tapping or selecting message bar region 431 a keyboard is displayed such that the user is able to comprise a message to be posted within dynamic discussion region 430. In further embodiments, upon a user selecting message bar 431 a user is prompted to speak a message into the user's microphone. In particular embodiments, upon speaking into the microphone the spoken message is then converted into text to be displayed in dynamic discussion region 430. In further embodiments, a sound file is placed within dynamic discussion region 430 which may then be played by other user.

Figure 5A:
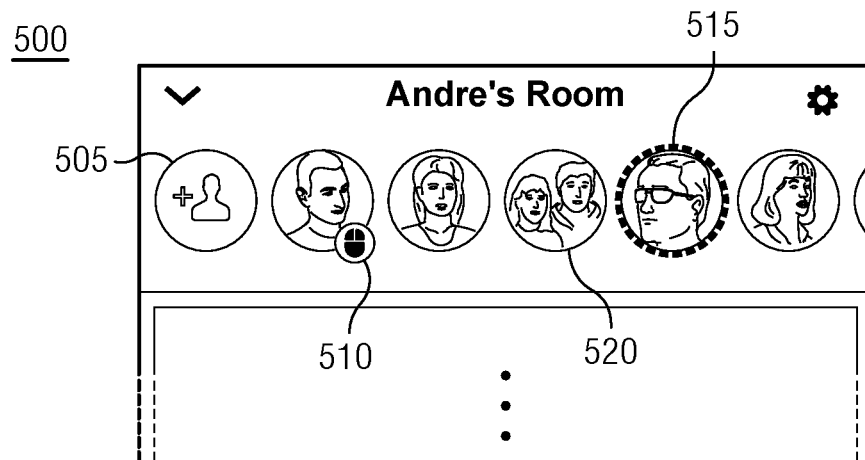
FIG. 5A illustrates an example UI of a user list bar.

FIG. 5A illustrates an example of different types of friend bar 410 interactions. As an example and in one embodiment, add friend 505 allows a user to invite a friend into the virtual room. In particular embodiments, the owner of the room may invite other users into the owner's room. In further embodiments, any user currently within the virtual room of the owner may be permitted to invite others into the room through add friend 505.

In particular embodiments, friend bar 410 may display different modes of interaction that may occur within the virtual room. For example, each avatar of each user may be displayed within friend bar 410. With reference to FIG. 5A, the example illustrated displayed at least six user's within the virtual room. Friend bar 410 may be swiped, scrolled, tilted, or any other suitable way to view the remaining user's within the virtual room. In particular embodiments, the users may be displayed by a priority. The priority may be based on activity, ownership, social-relevance, proximity within users, etc. In particular embodiments remote icon 510 may be placed on or near the avatar of the user who "has control" of the virtual room. For example, the user with remote icon 510 may hold permissions to select the displayed content in current content 420 displayable region. In particular embodiments, remote icon 510 may change colors (e.g., red to green) when a user is "using" the remote control. For example, remote icon 510 may turn green when the user who is holding the remote is currently or presently looking for content to display in current content 420 displayable region. Upon selecting new or different content to be displayed and leaving edit/control mode remote icon 510 may turn red. This allows other users of the room to know when the user who holds the remote is currently looking for new or different content to be displayed. For example, upon noticing that remote icon 510 has changed to an "on" color or icon the other users in the room may be more inclined to give recommendations for the next video or content that is to be displayed. In particular embodiments, remote icon 510 may be represented as a mouse, company logo, or any other suitable icon.

In particular embodiments, friend bar 410 may display whether a user is currently texting or speaking through talk icon 515. For example, in particular embodiments, when a user is typing a message to be displayed in dynamic discussion region 430 talk icon 515 may appear around the user's avatar. In further embodiments, when a user is speaking talk icon 515 may similarly appear around the user's avatar. In particular embodiments, a different color or type of icon may be displayed around the user's avatar depending on whether the user is typing or speaking. For example, when the user is typing a blue dashed line in the form of a circle may be displayed around the avatar. In a further example, when the user is speaking an orange solid line in the form of a circle may be displayed around the avatar. One of ordinary skill in the art would realize that any type of combination of lines and colors may be used to depict the above disclosure.

Figure 5B:
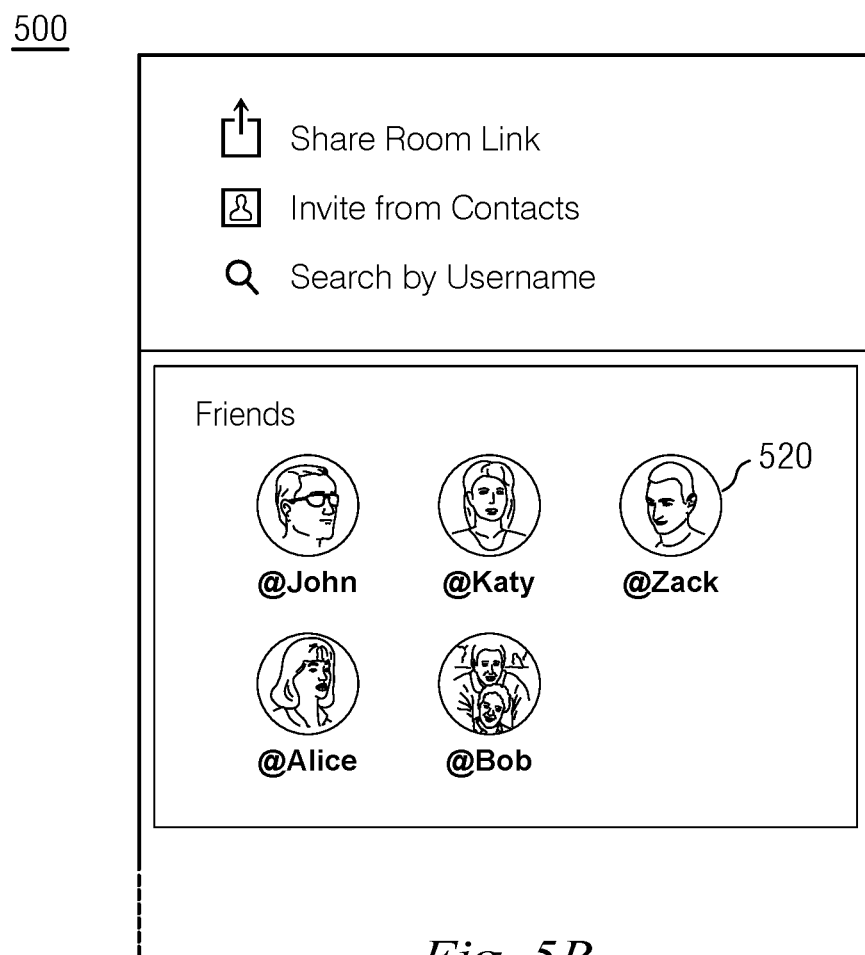
FIG. 5B illustrates an example of an options menu.

FIG. 5B illustrates an example UI screen after selecting add friend 505. For example, upon a user selecting add friend 505 icon the user may be displayed a menu that allows the user to share the room link, invite others to the room, or search for particular users by username. In addition to the above options the user may be displayed a list of the user's current friends. In particular embodiments, if a user selects the Share Room link option the user may be given a url address to be shared with others. In particular embodiments, only the owner of the room may be given this option. In further embodiments, any user in the room may be allowed to share the link. Allowing a user to invite from contacts brings up the user's contacts and permits the user to select a contact to send an invite to. For example, the user's contacts may be Rabbit contacts. In another example, the user's contact may be contacts from the user's Gmail, Outlook, or Mail account.

FIG. 5C illustrates an example UI after selecting one of the users located in friend bar 410. In particular embodiments, the UI displayed in FIG. 5C is presented to the room owner. In further embodiments, the UI displayed in FIG. 5C may be presented to the current holder of the remote control. For example, the room owner of the room may select a user in friend bar 410 and "pass the remote" or "Give Rabbitcast Control" to that particular user. Upon the room owner selecting to pass remote or give control, remote icon 510 is removed from the previous remote holder and placed on the selected user who now is able to control the viewing content within the virtual room. In particular embodiments, either the current remote holder or the room owner, or both, is able to pass the remote controller. In further embodiments, the room owner is the only user who is able to pass the remote control. In further embodiments, the room owner may give "admin rights" to other users within the virtual room. In particular embodiments, upon a user being granted admit rights, such user may pass the remote controller.

FIG. 5D illustrates another example UI after selecting one of the users located in friend bar 410. In particular embodiments, the UI displayed in FIG. 5D is presented to the room owner after selecting a user that currently holds the remote controller for the room. For example, if a user besides the room owner currently is holding the remote for the virtual room, the room owner may wish to retain control of the remote. If the room owner desires, the room owner may select the avatar of the user that currently possesses remote icon 510 and may then choose to "take" back the remote control. Upon taking back the remote controller remote icon 510 is removed from the previous controller and placed at a near the avatar of the user who has taken the remote controller.

FIG. 5E illustrates another example UI after selecting one of the users located in friend bar 410. In particular embodiments, the UI displayed in FIG. 5E is presented to a user who is not the owner of the room. For example, a user who is not the room owner may desire to control the viewing content shown within the virtual room. In particular embodiments, the user may select the user which currently possesses remote icon 510 and "request" control of the remote. In further embodiments, the user may select the room owner's avatar (who may or may not currently possess the remote) and "request" control of the remote. In particular embodiments, an icon may be displayed upon a user requesting control of the remote. In particular embodiments, the request icon may be of a similar size and shape of remote icon 510, but may display a different image (e.g., and exclamation point) and be of a different color. This may allow the users of the room to differentiate from the current remote holder and the other users who have expressed the desire to also control the viewing content within the room. In further embodiments, upon a user requesting control of the remote a notification may be sent to the user who currently possesses the remote or the room owner. In further embodiments, upon a user requesting the remote a pop-up notification may appear on the current remote holders screen that allows the user to pass the remote, keep the remote, or pass the remote in a certain amount of time.

Figure 6:
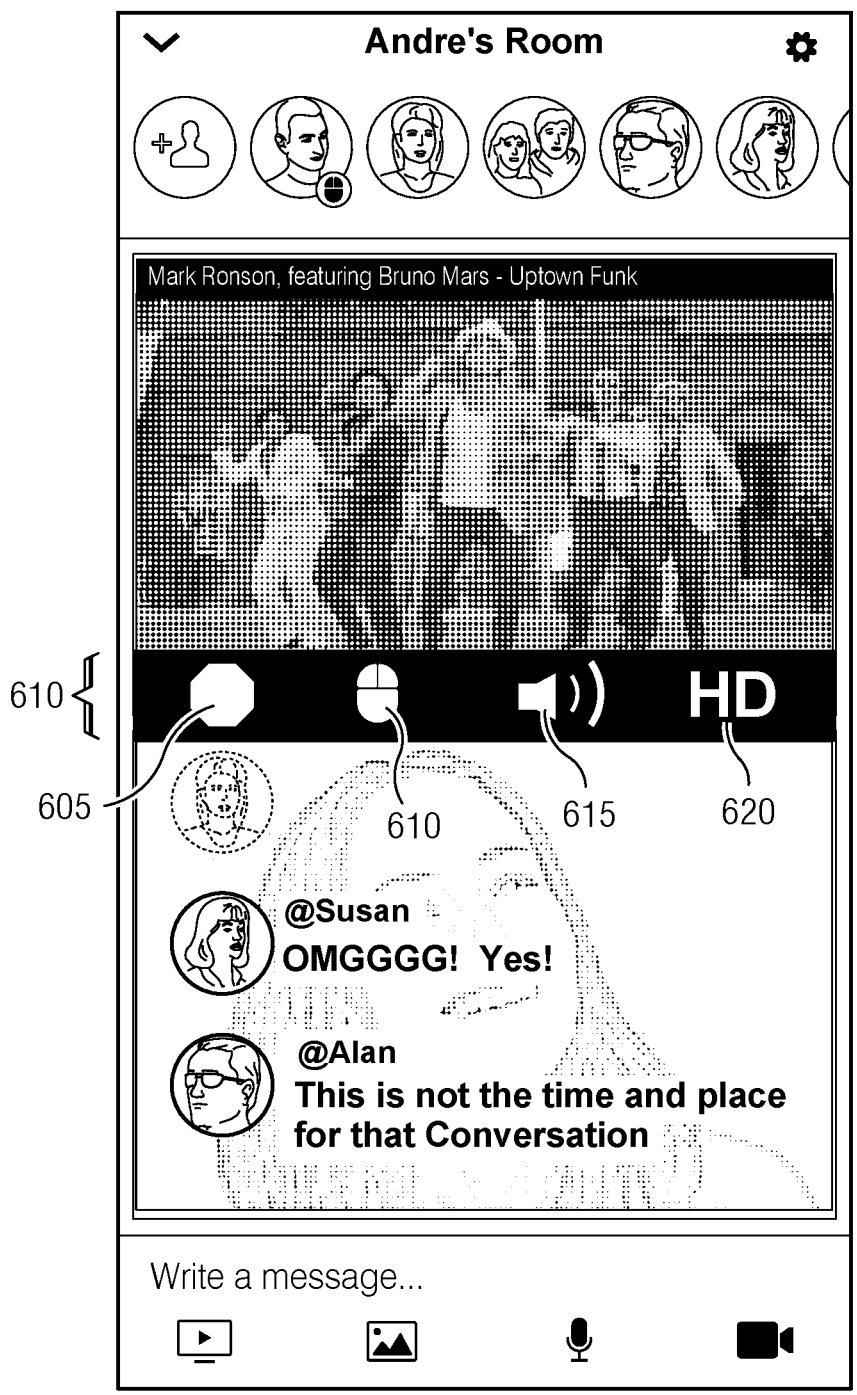
FIG. 6 illustrates another example of a device in viewing mode while in a portrait orientation.

FIG. 6 illustrates an example virtual room UI with displayed options. In particular embodiments, upon tapping or selecting in current content 420 displayed region action bar 610 may be presented to the user. In particular embodiments, action bar 610 may allow display stop icon 605, control icon 610, sound icon 615, and quality icon 620. In particular embodiments, action bar 610 may be presented on a per user basis (e.g., room owners, visitors, or remote controllers may be displayed different icon within action bar 610). In further embodiments, each user may be displayed the same universal icons. In particular embodiments, pressing stop icon 605 stops all content from being displayed within current content 420 displayable region. In further embodiments, pressing stop icon 605 stops the entire room (e.g., video stream and chat). In further embodiments, stop icon 605 is presented to the room owner and not the other users of in the room. In further embodiments, stop icon 605 is presented to each user in the room and upon a user selecting stop icon 605 the content is stopped as to that particular user, but continues for the remaining users in the room. In further embodiments, upon selecting stop icon 605 the displayed content is stopped for each user in the room.

In particular embodiments, and with regard to FIG. 6, action bar 610 may display sound icon 615. In particular embodiments, sound icon 615 is used to adjust the volume of the content displayed in current content 420 displayable region. In further embodiments, sound icon 615 may be used to adjust the volume of the entire room (e.g., video and sound of other in the room). In particular embodiments, action bar 615 may display quality icon 620. In particular embodiments, upon a user selecting quality icon 620 the user may be displayed a list of options for streaming content at different settings (e.g., 720p, 1080p, low, medium, high, HD, etc.). In further embodiments, action bar 610 may also display a "full screen" option that changes the displayable region to the entire screen. For example, instead of including current content 420 and dynamic discussion region 430, upon selecting full screen mode the user's entire screen would comprise of the selected content for viewing.

In particular embodiments, action bar 610 may display control icon 610. In particular embodiments, control icon 610 matches the image of remote icon 510, but may be different in size and color. In particular embodiments, if a user selects control icon 610, but does not currently have control of the remote a request for the remote is automatically send to either the room owner or currently remote controller. In particular embodiments, control icon 610 is displayed when a user also has remote icon 510. When a user selects control icon 610 and has permission to take control the user is displayed a different UI. An example of the displayed UI is illustrated in FIG. 7.

Figure 7:
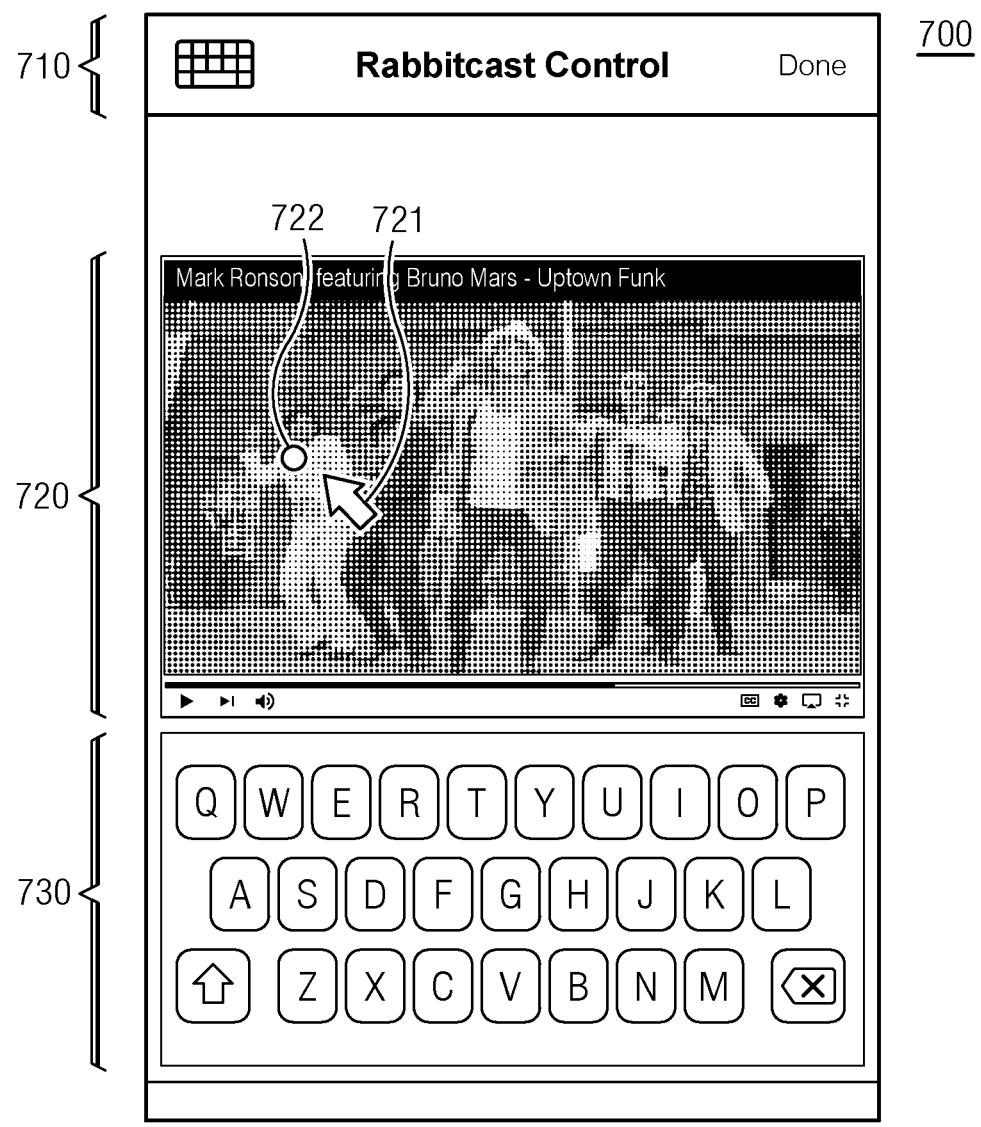
FIG. 7 illustrates an example of a device in control mode while in a portrait orientation.

FIG. 7 illustrates an example UI of control mode. For example, FIG. 7 depicts an example of a UI after a user has selected to control or edit the current content being displayed within the room. For example, a user may be displayed a screen similar to that depicted in FIG. 7 after a user has selected control icon 610. After selecting control icon 610 a user is permitted to control the content that is displayed to the users within the virtual room. In particular embodiments, once a user selects control icon 610 and is switched to control mode, as opposed to viewing mode, the user is able to remotely control a desktop and is able to change currently displayed content 720. In particular embodiments, upon selecting control icon 610 keyboard 730 appears on the UI. Keyboard 730 allows the user in control mode to type in URL's, text fields, or use the keyboard for any other suitable purposes. In particular embodiments, once in control mode control bar 710 may be displayed across the top of the screen. In particular embodiments, control bar 710 may include a keyboard icon. Selecting the keyboard icon will either display or hide keyboard 730. In particular embodiments, control bar 710 may act as a notification to the user that the user is no longer in view mode, but has entered control mode.

In particular embodiments, and with further reference to FIG. 7, mouse pointer 721 and mouse guide 722 may appear in the UI upon entering control mode. In particular embodiments, upon entering control mode a user is permitted to remotely control mouse pointer 721 from the user's touch device. In particular embodiments, mouse guide 722 is located substantially near mouse pointer 721, however, if there is delay or lag, mouse pointer 721 will appear to lag behind mouse guide 722. Mouse guide 722 is displayed in real-time and because the icon is not being displayed from a remote screen, the icon will show no signs of delay or lag. In particular embodiments, mouse guide 722 allows a more friendly user experience when the mouse pointer becomes laggy or delayed. In particular embodiments, a user in control is able to use the remote desktop through control mode and select on new or different content that the user desires to be played. Upon selecting the new content (e.g., a different YouTube channel, a new Netflix show, etc.) the content may be displayed in currently displayed content 720 region. After the user has selected her desired content, the user may press "Done" and is returned to viewing mode where the user is able to chat and watch the new selected content.

Figure 8A:
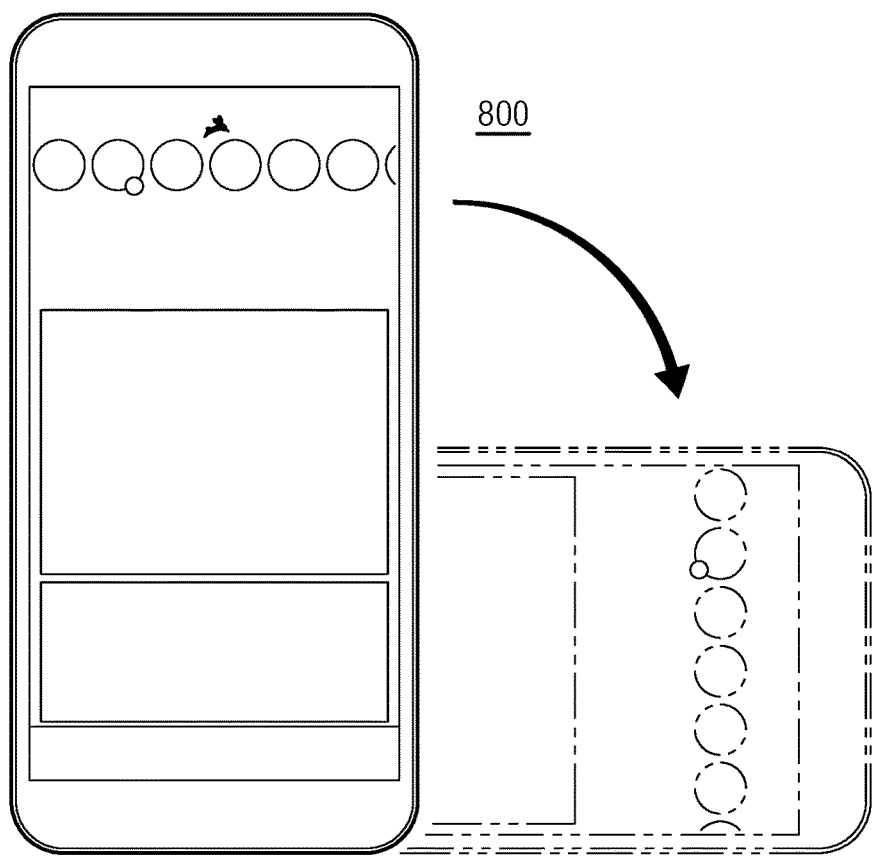
FIGS. 8A-B illustrate an example of turning a device from portrait to landscape mode.
Figure 8B:
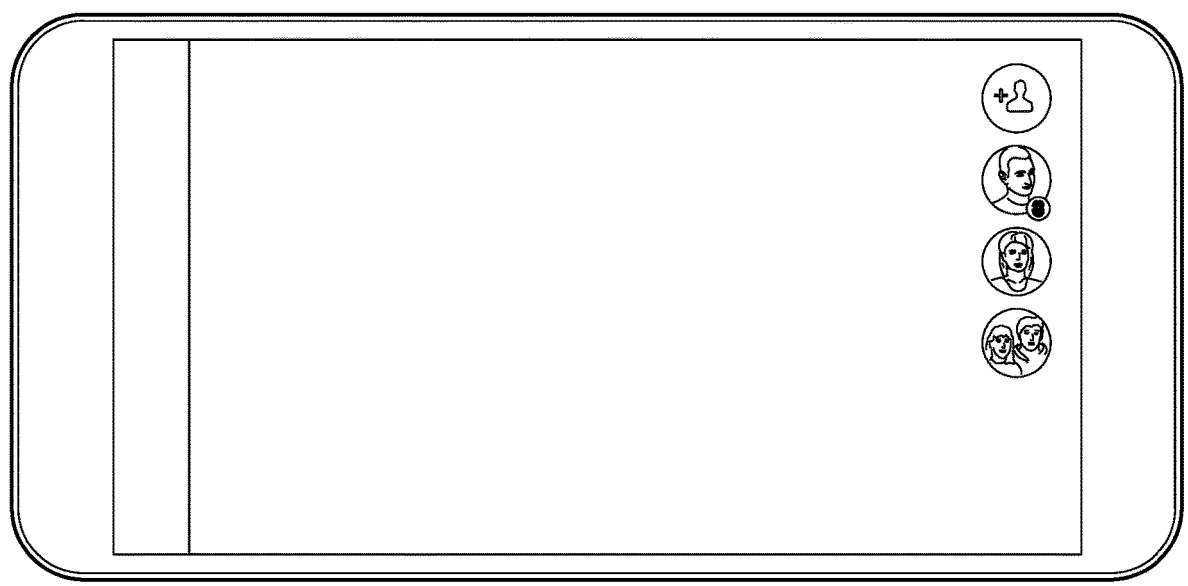

FIG. 8A illustrates a wireless device changing from portrait to landscape mode. In particular embodiments, a user may change the orientation of her device. For example, a user may desire to switch the orientation of her device from portrait to landscape mode for a more enjoyable viewing experience. In particular embodiments, the displayed UI in portrait mode may be changed to the UI displayed in FIG. 8B. FIG. 8B illustrates an example UI upon changing the device to landscape mode. In particular embodiments, upon changing the device to landscape mode (e.g., viewing mode) the friend's bar may be placed horizontally down the device while still maintaining the same attributes as depicted in portrait mode.

Figure 8C:
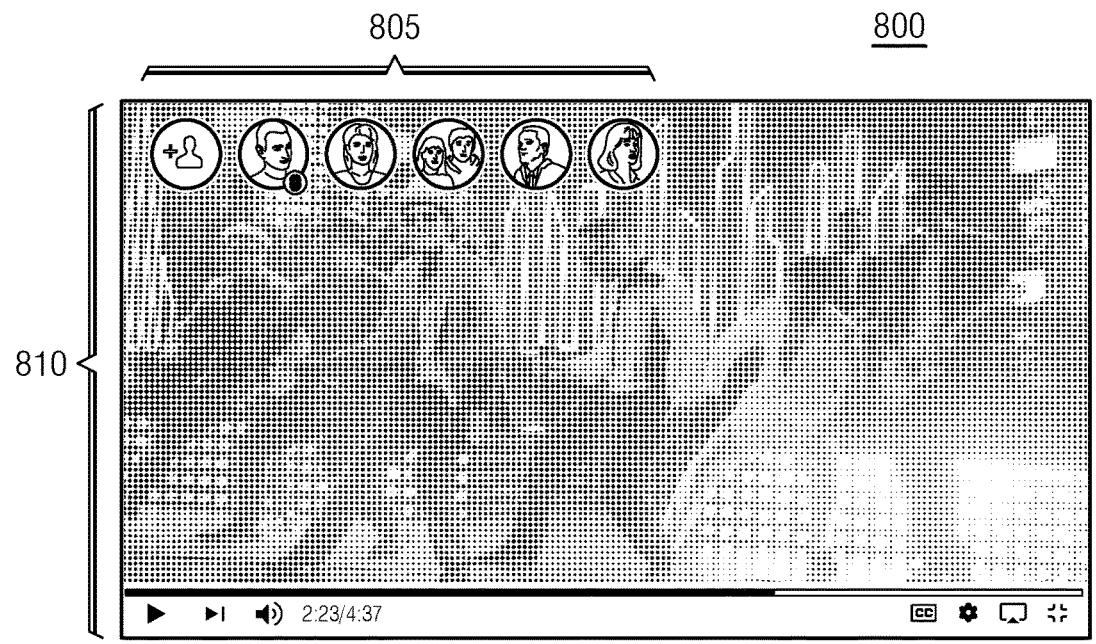
FIG. 8C illustrates an example of a device in viewing mode while in a landscape orientation.

FIG. 8C illustrates an example UI while a user is in viewing mode. In particular embodiments, friend bar 805 may either be placed across the top portion of the device or horizontally as shown in FIG. 8B. In further embodiments, friend bar 805 may be placed at any location on the screen, as a group or individually. In particular embodiments current content 420 displayable region may encompass the entire screen of the device. For example, upon turning the device to landscape mode (e.g., viewing mode) dynamic discussion region 430 is no longer displayed. This may allow for users a more enjoyable viewing experience without chat distractions.

Figure 9A:
FIG. 9A illustrates another example of a device in viewing mode while in a landscape orientation.
Figure 9B:
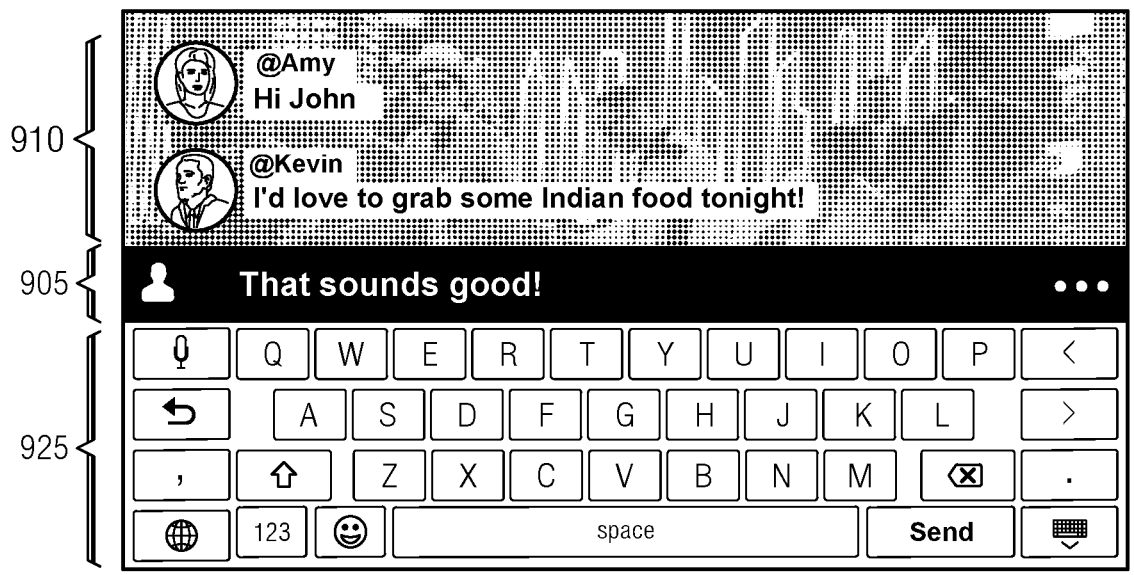
FIG. 9B illustrates yet another example of a device in viewing mode while in a landscape orientation.

FIG. 9A illustrates a viewing mode with chat messages. For example, a user in viewing mode may still be able to view and send chat messages. In particular embodiments, upon tapping the screen message box 905 may appear. For example, upon tapping or selecting "Write a message" within screen message box 905, a UI similar to that depicted in FIG. 9B may be displayed. In particular embodiments, upon tapping or selecting message box 905 may display a keyboard such that the user is able to type a message to be displayed within the chat. In further embodiments, Message box 905 depicts how many users are currently in the room at user count 925. For example, and with reference to FIG. 9D, upon selecting or tapping user count 925 a menu may appear that allows the user to scroll through the users currently in the room. In particular embodiments, upon selecting one of the users a user may be able to instant message, pass the remote, send an invite, etc., to the selected user. In particular embodiments, message box 905 may also comprise editing tools 920. In particular embodiments, when a user posts in the room posts a message the message may appear on the user's screen in dynamic discussion region 910. In particular embodiments, dynamic discussion region 910 is different from the region as shown while the device is in portrait mode because the region is no longer a dedicated chat location. In particular embodiments, dynamic discussion region 910 may be placed over current content 810. For example, when a message is posted to the room while a device is in viewing mode the message may appear in dynamic discussion region 910 and in current content 810. That is, the message is simply placed over current content 810. In particular embodiments, as messages are received they may be displayed from bottom up (i.e., the most recent messages are displayed starting from the bottom and working up). In particular embodiments, the messages may be displayed in a top down method. In particular embodiments, the user is able to turn on or off dynamic discussion 910. For example, a user may not wish to have his viewing experience alerted with chat messages appearing on his device and may elect to turn off the chat mode.

Figure 9C:
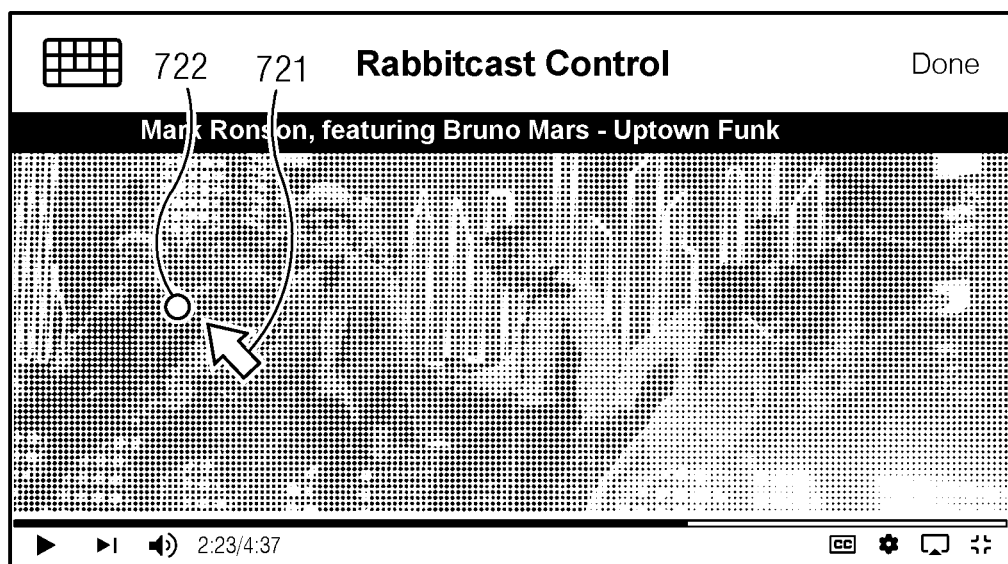
FIG. 9C illustrates an example of a device in editing mode while in a landscape orientation.
Figure 9D:
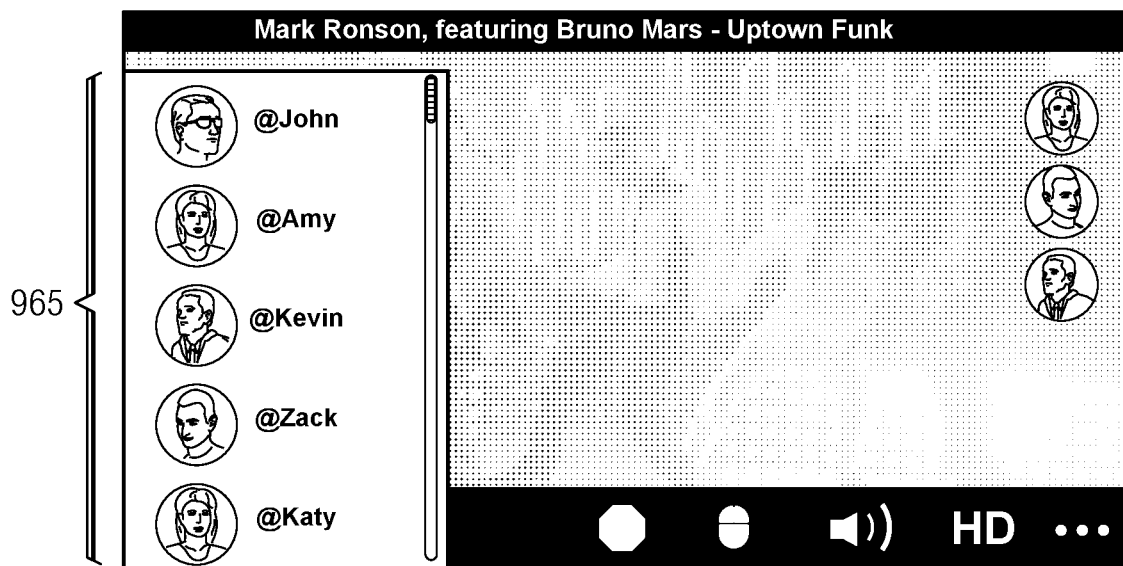
FIG. 9D illustrates yet another example of a device in viewing mode while in a landscape orientation.

With further reference to FIG. 9A, message box 905 may comprise editing tools 920. The tools are substantially similar to those described above when using the device in portrait mode. For example, upon selecting the mouse icon (and assuming the user has "control" of the room) a user may be presented with a UI similar to that depicted in FIG. 9C. FIG. 9C illustrates an example UI for controlling or editing the currently displayed content. The editing mode shown in FIG. 9C works in a substantially similar way as described in FIG. 7.

Figure 10:
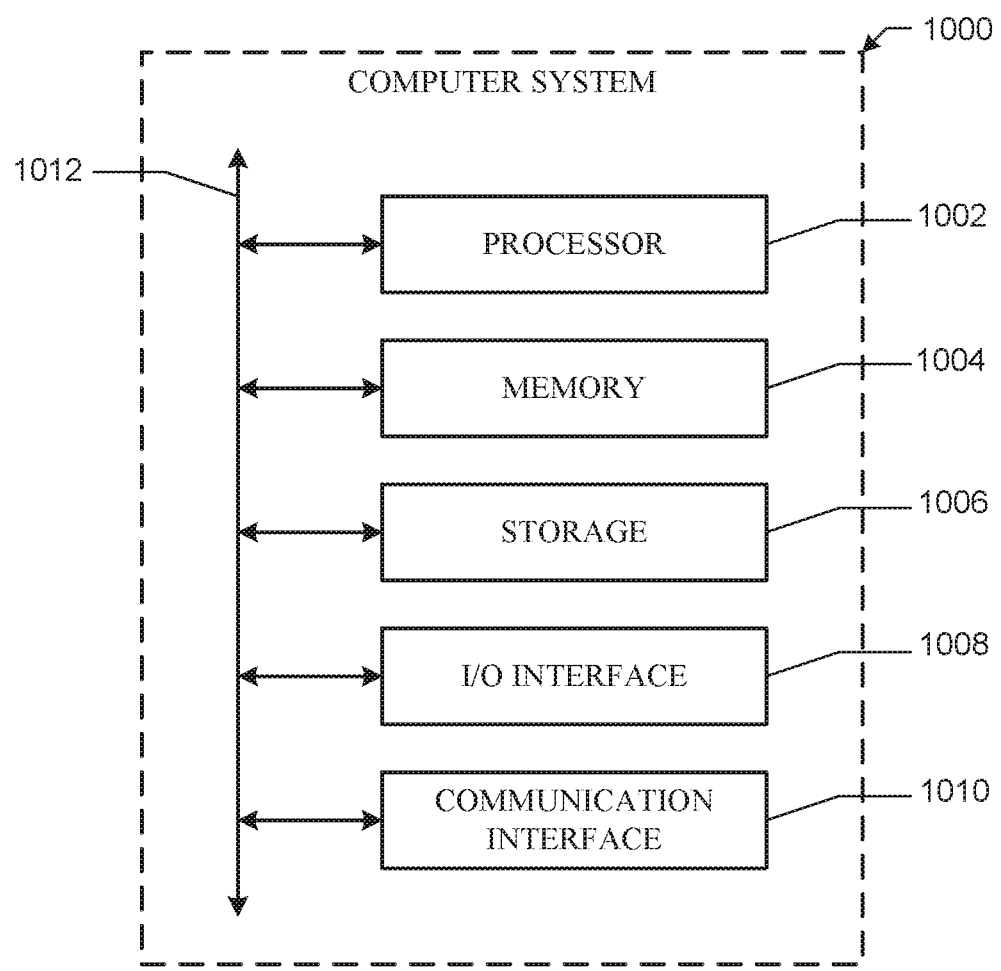
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-onchip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

As explained herein, in particular embodiments, a computing device provides for presentation to a user a user interface including a virtual room service. In particular embodiments, the user may be able to view content through landscape mode or portrait mode. In particular embodiments, the virtual room service may allow for multiple modes of operation. In particular embodiments, a user may be permitted to view content currently displayed within the virtual room. In further embodiments, a user may be permitted to edit the content that is currently displayed within the virtual room. In particular embodiments, a user editing the content currently displayed may hold access permission to control the room. In further embodiments, the user editing the content currently displayed within the virtual room may hold a virtual remote. In further embodiments, the room may be notified of the user who is currently in control through the use of an icon that is displayed on or near the avatar of the user who holds current control of the room.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

What is claimed is:

1. A method comprising:
providing, to each of a plurality of client devices, at least part of a graphical user interface (GUI) corresponding to a virtual room, wherein the virtual room contains a plurality of users;
providing, to each of the plurality of client devices, a first portion of the GUI identifying at least some of the plurality of users in the virtual room; and
providing, to each of the plurality of client devices, a second portion of the GUI displaying:
one or more user interactions from one or more of the plurality of users; and
for each user interaction, an identification of each particular user who generated the user interaction, wherein the identification of each particular user comprises:
for a first user currently generating a user interaction, a background image of the first user currently generating the user interaction, wherein the background image of the first user has a first size; and
for each of one or more second users who have previously generated a user interaction that is displayed on the second portion of the GUI, a foreground image of the second user displayed on top of the background image of the first user currently generating the user interaction, wherein the foreground image of each second user has a second size that is less than the first size.

2. The method of claim 1, wherein the first size substantially fills the second portion of the GUI.

3. The method of claim 1, wherein:
the background image of the first user comprises a video of the first user; and
the foreground image of each second user comprises a picture of the second user.

4. The method of claim 3, wherein the current interaction comprises the first user speaking.

5. The method of claim 1, wherein:
the current interaction comprises entry of one or more characters by the first user; and
the method further comprises:
determining one or more colors associated with the background image; and
providing, to each of the plurality of client devices, the one or more characters in one of the one or more colors associated with the background image.

6. The method of claim 5, wherein the color of the one or more characters is different than one or more other colors used to display characters associated with one or more previous user interactions.

7. The method of claim 1, wherein:
the second portion of the GUI comprises a plurality of sub-portions, each sub-portion identifying a background image of one of a plurality of first users who are currently generating content;
the plurality of sub-portions substantially fill the second portion of the GUI; and
the foreground image of each of the one or more second users are displayed on top of the plurality of sub-portions.

8. The method of claim 1, further comprising:
providing, to each of the plurality of client devices, a third portion of the GUI displaying virtual-room content, wherein at least one of the plurality of users controls the content displayed in the third portion of the GUI.

9. The method of claim 8, wherein:
the content is controlled by one first user; and
a visual indicator is displayed in association with an identification of the first user, the visual indicator identifying that the first user controls the content.

10. The method of claim 9, wherein the visual indicator changes appearance when the first user changes, or is in the process of changing, the content displayed in the third portion.

11. The method of claim 10, wherein the change of appearance comprises a change of color of the visual indicator.

12. The method of claim 8, wherein a second visual indicator is displayed in association with an identification of one or more second users, the second visual indicator identifying that the second user is requesting to control the content displayed in the third portion.

13. One or more non-transitory computer-readable storage media embodying software that is operable when executed by one or more processors to:
provide, for each of a plurality of client devices, at least part of a graphical user interface (GUI) corresponding to a virtual room, wherein the virtual room contains a plurality of users;
provide, for each of the plurality of client devices, a first portion of the GUI identifying at least some of the plurality of users in the virtual room; and
provide, for each of the plurality of client devices, a second portion of the GUI displaying:
one or more user interactions from one or more of the plurality of users; and
for each user interaction, an identification of each particular user who generated the user interaction, wherein the identification of each particular user comprises:
for a first user currently generating a user interaction, a background image of the first user currently generating the user interaction, wherein the background image of the first user has a first size; and
for each of one or more second users who have previously generated a user interaction that is displayed on the second portion of the GUI, a foreground image of the second user displayed on top of the background image of the first user currently generating the user interaction, wherein the foreground image of each second user has a second size that is less than the first size.

14. The one or more non-transitory computer-readable storage media of claim 13, wherein:
the background image of the first user comprises a video of the first user; and
the foreground image of each second user comprises a picture of the second user.

15. The one or more non-transitory computer-readable storage media of claim 13, wherein:
the current interaction comprises entry of one or more characters by the first user; and
the one or more processors further to:
determine one or more colors associated with the background image; and
provide, to each of the plurality of client devices, the one or more characters in one of the one or more colors associated with the background image.

16. The one or more non-transitory computer-readable storage media of claim 13, wherein:
the second portion of the GUI comprises a plurality of sub-portions, each sub-portion identifying a background image of one of a plurality of first users who are currently generating content;

the plurality of sub-portions substantially fill the second portion of the GUI; and the foreground image of each of the one or more second users are displayed on top of the plurality of sub-portions.

17. A system comprising: one or more processors; and a memory coupled to the processors comprising instructions executable by the processors, the processors operable when executing the instructions to:

provide, for each of a plurality of client devices, at least part of a graphical user interface (GUI) corresponding to a virtual room, wherein the virtual room contains a plurality of users;

provide, for each of the plurality of client devices, a first portion of the GUI identifying at least some of the plurality of users in the virtual room; and provide, for each of the plurality of client devices, a second portion of the GUI displaying:

one or more user interactions from one or more of the plurality of users; and for each user interaction, an identification of each particular user who generated the user interaction, wherein the identification of each particular user comprises:

for a first user currently generating a user interaction, a background image of the first user currently generating the user interaction, wherein the background image of the first user has a first size; and for each of one or more second users who have previously generated a user interaction that is displayed on the second portion of the GUI, a foreground image of the second user displayed on top of the background image of the first user currently generating the user interaction, wherein the foreground image of each second user has a second size that is less than the first size.

18. The system of claim 17, wherein:

the background image of the first user comprises a video of the first user; and the foreground image of each second user comprises a picture of the second user.

19. The system of claim 17, wherein:

the current interaction comprises entry of one or more characters by the first user; and the processors operable when executing the instructions further to:

determine one or more colors associated with the background image; and provide, to each of the plurality of client devices, the one or more characters in one of the one or more colors associated with the background image.

20. The system of claim 17, wherein:

the second portion of the GUI comprises a plurality of sub-portions, each sub-portion identifying a background image of one of a plurality of first users who are currently generating content;

the plurality of sub-portions substantially fill the second portion of the GUI; and the foreground image of each of the one or more second users are displayed on top of the plurality of sub-portions.

* * * * *